Aug. 18, 1931.  H. VADEBONCOEUR  1,819,930
ANTISKID CHAIN
Filed Aug. 19, 1930
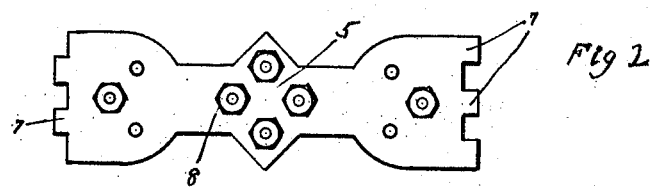
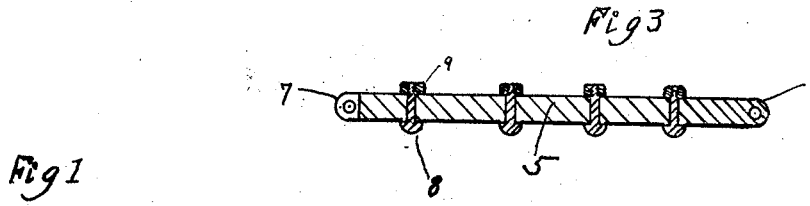
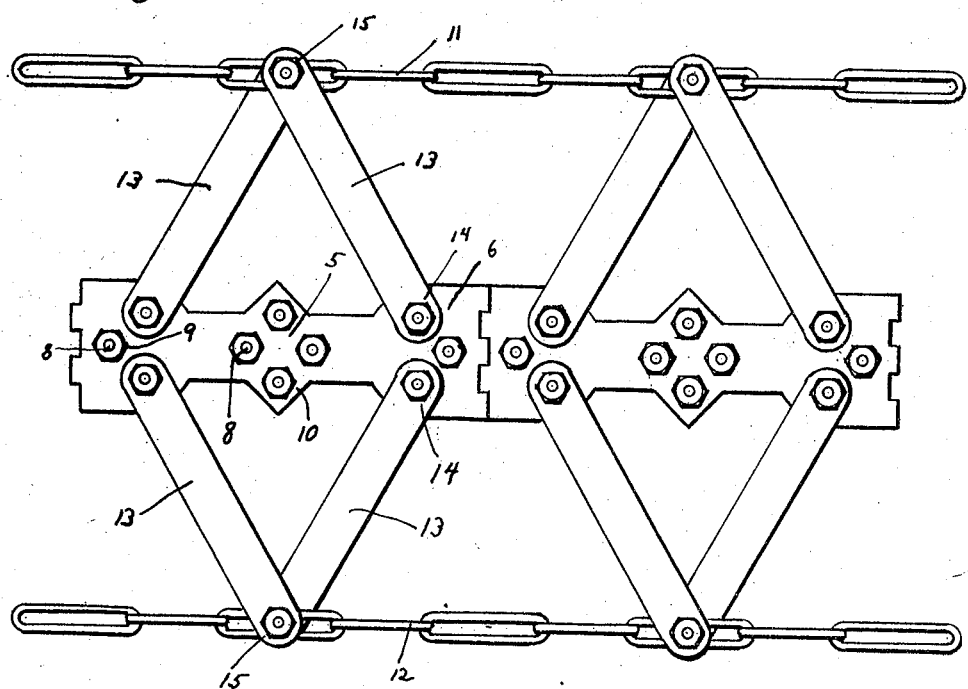
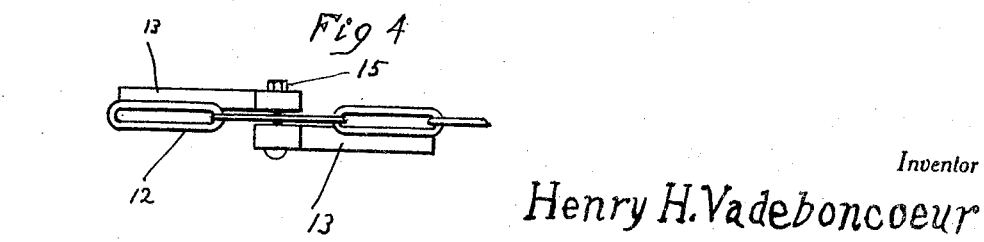
Inventor
*Henry H. Vadeboncoeur*
By *Clarence A. O'Brien*
Attorney Patented Aug. 18, 1931

1,819,930

UNITED STATES PATENT OFFICE

HENRY VADEBONCOEUR, OF KANKAKEE, ILLINOIS

ANTISKID CHAIN

Application filed August 19, 1930. Serial No. 476,421.

This invention relates to improvements in tire chains and the primary object of this invention is to provide an anti-skid chain for pneumatic tires that is more solid, more efficient and of less complicated structure than similar devices, and further to provide a chain which may be readily placed in position on the tire and removed therefrom.

Other objects and advantages of the invention will become apparent during a study of the following description, taken in connection with the accompanying drawings, wherein:

Figure 1 is a fragmentary top plan view of my improved chain,

Figure 2 is a top plan view of one of the gripping plates,

Figure 3 is a longitudinal sectional view taken through the gripping plates,

Figure 4 is a detail side elevational view illustrating certain details of construction hereinafter more fully referred to.

With reference more in detail to the drawings, it will be seen that my improved anti-skid comprises a plurality of elongated plates 5 which may be formed of metal or any other suitable material and which are identical in construction. Each of the plates 5 have elongated relatively narrow portions merging at opposite ends into relatively wide end portions 6, each of which end portions are provided with hinge knuckles 7 whereby to facilitate hingedly connecting the plates together at the adjacent ends of the plates as clearly suggested in Figure 1. Of course any suitable hinge 10 may be used for this purpose as is apparent.

Furthermore, each of the plates 5 intermediate their ends are provided with longitudinally spaced bolts 8, the bolts 8 being arranged in longitudinal spaced alinement and have their edge disposed so as to be placed between the plates and the tread of the tire, there being suitable octagonal nuts threaded on the upper end of the bolt, the nuts being designated by the reference character 9. Intermediate their ends, the plates 5 are also each provided with relatively short substantially V-shaped extensions 10 projecting laterally from opposite sides thereof, and each of the extensions 10 have extended therethrough a suitable bolt similar to the bolts 8, and the bolt also has an octagonal nut threaded thereon similar to the nut 9.

The plates 5 are each connected to side chains 11 and 12 through the medium of a plurality of relatively slack flexible strap members, which strap members may be made of metal or any other suitable material and are arranged in pairs. A pair of strap members 13 are each secured at one end thereof to one end 6 of the plate 5 as at 14 and the free end of the straps 13 are pivoted to each other through the medium of a pivot bolt 15 which extends through the said free end of the straps and through a link in the side chain 11.

A second pair of straps 13' are also each, pivoted at one end to one end 6 of the plate 5 as at 14' and at their opposite ends are pivoted together through the medium of a pivot bolt 15' which extends through said end of the strap and through a length in the side chain 12. Each of the connecting means 14, 14', 15 and 15', consist merely of a bolt, the head part of which is adapted to be disposed against the tire, and on the free end of the bolt is threaded a suitable octagonal nut similar to the nut 9 and cooperates with the nuts 9 to provide traction or ground engaging elements for the chain.

In use, it will be seen that the chain may be readily placed about the tire, with the side chains 11 and 12 extending along the opposite sides of the tire, and the plates 5 resting on the tread of the tire extending circumferentially about the entire tire, with the straps 13 and 13' because of their flexible nature conforming to the shape of the tire in cross section.

Even though I have herein described the preferred embodiment of my invention, it is to be understood that the same is susceptible to changes fully comprehended by the spirit of the invention as herein described, and the scope of the appended claim.

Having thus described my invention, what

I claim as new is:

A tire chain comprising a plurality of hingedly connected plates adapted to extend circumferentially about the tire, a pair of side chains, and flexible straps connected to the plate adjacent each end and extending outwardly from each side thereof with the outer ends of the straps overlapped and positioned at opposite sides of an adjacent chain and a bolt inserted through the overlapped ends of the straps and also through one of the links of the chain to provide limited longitudinal movement of the chains with respect to the plates.

In testimony whereof I affix my signature.

HENRY VADEBONCOEUR.